US008665428B2

(12) United States Patent
Fösel et al.

(10) Patent No.: US 8,665,428 B2
(45) Date of Patent: Mar. 4, 2014

(54) METHOD AND DEVICE FOR EXAMINING A LASER SYSTEM

(75) Inventors: Matthias Fösel, Memmelsdorf (DE); Olaf Kittelmann, Berlin (DE); Klaus Vogler, Eckental (DE)

(73) Assignee: Wavelight GmbH, Erlangen (DE)

( * ) Notice: Subject to any disclaimer, the term of this patent is extended or adjusted under 35 U.S.C. 154(b) by 0 days.

(21) Appl. No.: 13/501,121

(22) PCT Filed: Nov. 9, 2009

(86) PCT No.: PCT/EP2009/008001
§ 371 (c)(1),
(2), (4) Date: Apr. 10, 2012

(87) PCT Pub. No.: WO2011/054367
PCT Pub. Date: May 12, 2011

(65) Prior Publication Data
US 2012/0206720 A1    Aug. 16, 2012

(51) Int. Cl.
*G01J 1/00* (2006.01)
*G01J 1/34* (2006.01)
*G01J 1/42* (2006.01)

(52) U.S. Cl.
CPC . *G01J 1/4257* (2013.01); *G01J 1/00* (2013.01)
USPC .......................................... 356/213; 356/218

(58) Field of Classification Search
CPC ....................................... G01J 1/00; G01J 1/34
USPC .................................................. 356/213–236
See application file for complete search history.

(56) References Cited

U.S. PATENT DOCUMENTS

| 6,141,369 A * | 10/2000 | Seelert et al. ................... 372/97 |
| 7,387,027 B2 * | 6/2008 | Choi et al. ...................... 73/668 |
| 2004/0017833 A1 * | 1/2004 | Cundiff et al. .................. 372/18 |
| 2006/0114469 A1 | 6/2006 | Horvath et al. |

OTHER PUBLICATIONS

Stanislav, K. et al.: "Third-harmonic generation as a local probe for on-line monitoring of femtosecond optical breakdown in transparent materials", J. Opt. A: Pure Appl. Opt., IOP Publishing, Bristol, GB, Jul. 2003, vol. 5, pp. 362-366.

Miyagawa, H. et al.: "Measurement and Calculation of Laser Beam Spot Distortion caused by Dynamic Deformation of Scanning Mirror", IEEE/LEOS International Conference, Aug. 2005, pp. 137-138, XP010853287, ISBN: 978-0-7803-9278-6.

* cited by examiner

*Primary Examiner* — Michael P Stafira

(57) ABSTRACT

A method for analyzing a laser system, which has a focused laser beam and a controllable deflection assembly for controlling the transverse and/or longitudinal position of the beam focus, said method comprising the steps of directing the laser beam or a partial beam branched therefrom downstream of the deflection assembly toward an optically nonlinear medium for the purpose of generating frequency multiplied radiation, the wavelength of which corresponds to an uneven higher harmonic of the wavelength of the laser beam, activating the deflection assembly, and measuring a power of the frequency multiplied radiation while the deflection assembly is activated. The conversion efficiency of the nonlinear process by which the frequency multiplied radiation is produced is dependent upon the focusability of the laser beam. By evaluating the measured power of the frequency multiplied radiation, dynamic impairments of focusability can be detected, which can be caused by inertia-induced deformations of optical scan components of the laser system.

15 Claims, 2 Drawing Sheets

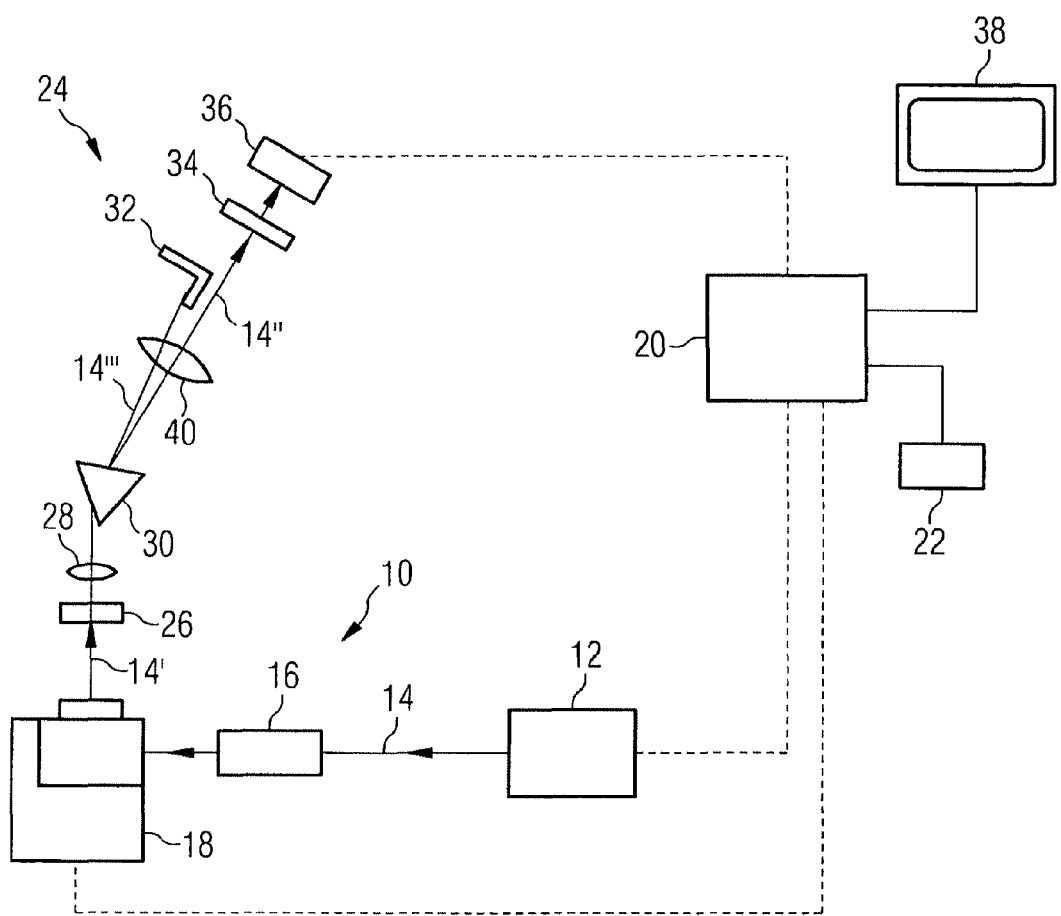

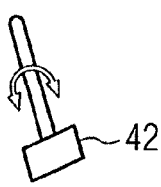

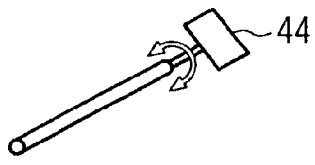

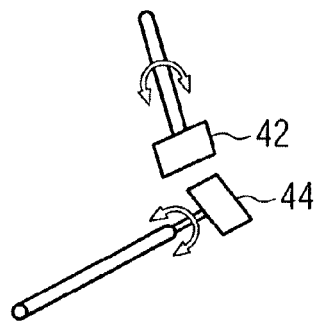
FIG 3
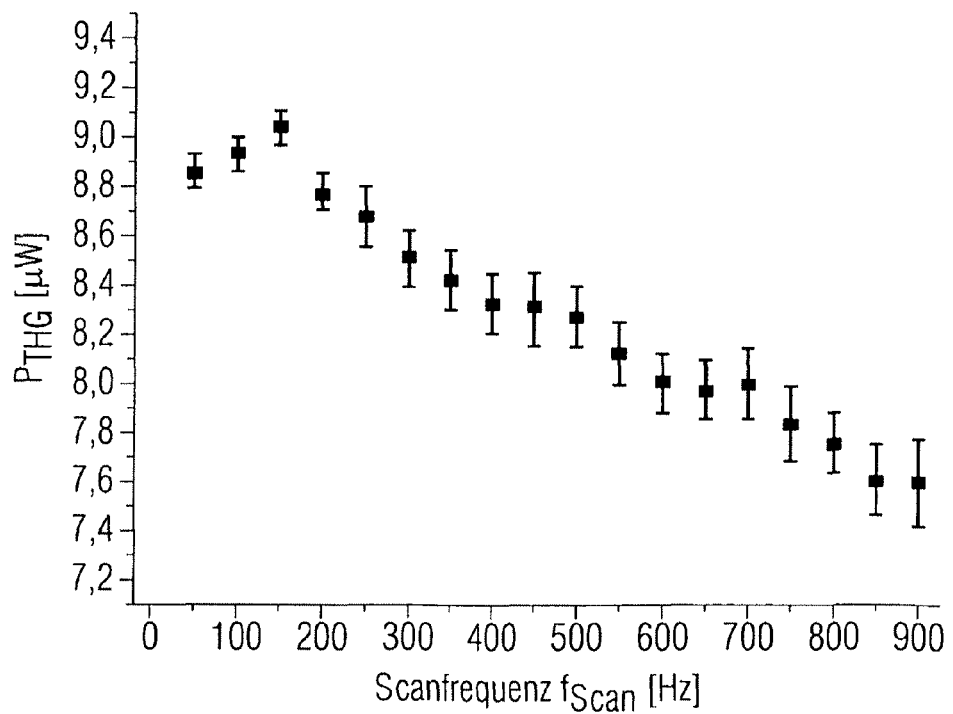

METHOD AND DEVICE FOR EXAMINING A LASER SYSTEM

This is a U.S. national phase application of co-pending international application number PCT/EP2009/008001 filed on Nov. 9, 2009, the disclosure of which is incorporated herein by reference.

BACKGROUND

The laser systems considered here are used for materials processing, wherein the material to be processed can be of any type. In addition to dead material, biological materials are also conceivable, which can be processed using a laser system of the type considered here. One example of a biological material is human eye tissue, for example, corneal tissue or lens tissue.

SUMMARY OF EXAMPLE EMBODIMENTS

The invention relates to the analysis of a laser system for the purpose of detecting wavefront distortions that can be caused by dynamic correction processes within the laser system. In the laser processing of materials, the use of so-called femtosecond laser systems (or Fs laser systems) is becoming more and more common. This is particularly true for the processing of materials that are transparent within the visible part of the spectrum. Fs laser systems operate using pulsed focused laser radiation, with pulse durations lying within the femtosecond range. Fs laser systems are particularly well suited for producing incisions into the depth of the material being processed. Of course, the material must be transparent to the laser radiation for this purpose. With a correspondingly strong focusing of the laser radiation, the laser power can be coupled into the interior of the material to be processed, without causing damage to the transradiated material areas that lie above the focal point. The process that takes place in the focal point is referred to as photodisruption. In the focal point, due to the highly intense radiation, the threshold for generation of a microplasma is exceeded; evaporation of a sphere of material having a diameter of approximately 1 µm occurs, for example. As a result, a microbubble having a diameter of approximately 5 to 12 µm is generated, for example, and separates the surrounding material and subsequently diffuses completely into the surrounding area.

Due to the extremely short duration of action per femtosecond pulse, no (or at least no significant) conduction of heat to the surrounding material areas can take place. Therefore, following dissipation of the plasma, all the effective energy and heat is essentially completely removed from the focal point. The elementary process that is applied in processing transparent materials using Fs laser radiation is frequently also referred to as laser-induced optical breakdown.

Standard laser systems are equipped with suitable deflection means (usually referred to as scanners), which enable an at least transverse, and particularly longitudinal position control of the focal point. In this context, longitudinal refers to a direction along the beam path of the laser radiation, whereas transverse refers to a direction within a plane that is perpendicular to said path. A notation customarily used in the field identifies the transverse plane as the x,y plane and the longitudinal direction as the z direction. If, by correspondingly controlling the deflection means, a sufficient number of several hundred, for example, or even several thousand of the cavities resulting from the above plasma discharge are placed adjacent to one another three-dimensionally in a desired shape, an incision in the material to be processed is produced. Nearly any incision figures can be produced in this manner.

It is easily understandable that in the case of ocular treatment, for example, the most stringent requirements with regard to cutting precision must be met. Such cases demand an extremely precise focal point of the Fs laser radiation and a high peak intensity. It has been found that during scanning of the laser radiation (i.e., with the transverse and/or longitudinal displacement of the focal point in accordance with the incision figure to be achieved), temporary impairments of the focusability of the laser radiation can occur. It has further been found that such impairments can be the result of inertia-induced deformations of optical components, which deformations can be adjusted during the course of the scanning process. The regularly desired short processing times accordingly require high adjustment speeds for the deflection components used for controlling the transverse or longitudinal position of the focal point. At such adjustment speeds, the inertia of the deflection components can cause undesirable deformations, which have a significant effect on the wavefront quality of the laser radiation. Such deformations are particularly problematic when the deflection components are adjusted in an oscillating fashion in rapid succession (i.e., back and forth). For example, for traditional scanner mirrors, such as are frequently used for transverse focus control, for example, a significant deformation of the surfaces, particularly in the region of the mirror edges, can be detected. As a result of these deformations, an incident, flat wavefront becomes a wavefront that is reflected with more or less distortion. Such distortions impair focusability in the processing plane and diminish cutting precision accordingly. Moreover, wavefront distortions can originate in the laser source itself.

The problem addressed by the invention is that of using measurement techniques to detect dynamic wavefront distortions in the laser radiation of a laser system, in order to allow the radiation quality and focusability of the radiation to be analyzed.

To solve this problem, the invention provides, according to one aspect, a method for analyzing a laser system, which provides a focused laser beam and a controllable deflection assembly for controlling the transverse and/or longitudinal position of the beam focus, wherein the method comprises:

directing the laser beam or a partial beam branched off from said beam downstream of the deflection assembly onto an optically nonlinear medium for the purpose of generating frequency multiplied radiation, the wavelength of which corresponds to an uneven higher harmonic of the wavelength of the laser beam, activating the deflection assembly, measuring a power of the frequency multiplied radiation with the deflection assembly activated.

For analyzing the focusability of scanned laser radiation, the invention teaches using processes whose efficiency is dependent upon the intensity of the applied laser radiation. Nonlinear frequency mixing satisfies this requirement. When analyzing dynamic changes in radiation quality with transverse scanning of the laser radiation, it is further required that the efficiency of the process should not be dependent (or at least not significantly) upon the direction of the applied laser radiation (which can be different depending upon the transverse focusing position). Particularly suitable for this purpose are multiplication processes of uneven order (third order, fifth order, seventh order, etc.) in isotropic media. However, because at higher orders a decrease in conversion efficiency is to be expected, within the context of the invention the tripling process is preferred.

In contrast, 3-wave mixing (frequency doubling) in an optically nonlinear crystal is unsuitable for analyzing transversely scanned laser radiation. Three-wave mixing of this type generally requires an anisotropic medium, wherein the conversion efficiency is highly dependent upon the propagation direction (phase adjustment). Because with transverse scanning, the propagation direction changes to a greater or lesser degree, this would interfere with and adulterate the measurement result.

In the case of frequency tripling, the intensity of the frequency tripled radiation (hereinafter abbreviated to THG radiation; THG: third harmonic generation) is cubically dependent upon the intensity of the incident radiation. Therefore, the efficiency of this process is dependent upon the peak intensity of the radiation applied to the nonlinear medium, which peak intensity is in turn dependent upon the spatial quality (beam-waist diameter, wavefront path) and the temporal quality (shape of the pulse envelopes, i.e., pulse duration) of the radiation. Assuming other influential parameters can be excluded, therefore, a temporary change in the power of the THG radiation can be attributed to a change in the focusability of the applied laser radiation. Such a change in focusability can be caused, for example, by a dynamic change in the wavefront path of the applied laser radiation.

In a preferred embodiment, the measured THG signal (measured power of the frequency tripled radiation) is recorded as a function of time and/or as a function of the scanner position. This makes it possible to dynamically detect the focusability of the laser radiation as a function of the scanner position, in real time, so to speak, and without destroying any test objects. Scanner position in this case refers to the adjustment of the deflection components which is necessary for an adjustment of the beam focus to a specific transverse and/or longitudinal position.

For conducting the analysis, the nonlinear medium is expediently arranged such that the laser beam or the partial beam branched therefrom is focused onto the nonlinear medium. The nonlinear medium can be a crystal, for example; however, other materials are also possible, for example, polymers or glass.

The power measurement of the frequency multiplied radiation is carried out while the deflection assembly is active, i.e., while the laser beam is being scanned in a transverse and/or longitudinal direction. The activation of the deflection assembly preferably comprises an oscillating adjustment of at least one deflection component of the deflection assembly. The dynamic behavior of the wavefront of the laser radiation can be different, depending upon the oscillation frequency or oscillation stroke. More particularly, it is possible for the wavefront distortions to become stronger, the higher the oscillation frequency, or the greater the oscillation stroke. Accordingly, the activation of the deflection assembly preferably comprises a change in the oscillation frequency and/or the oscillation stroke of the at least one deflection component. In this manner, the dynamic behavior of the wavefront distortions can be detected depending upon the oscillation frequency and/or the oscillation stroke.

The deflection assembly can be comprised of a plurality of deflection components (e.g., scanner mirrors), each of which enables only a partial deflection, for example, in only one direction. Each of these deflection components can have a different effect on the dynamics of the wavefront distortions in scanning of the laser beam. It is therefore expedient to determine not only the dynamic influence of the deflection assembly as a whole on the focusability of the laser beam, but also the dynamic influence of each individual deflection component. In particular, for this purpose, the activation of the deflection assembly can comprise a change in an activation pattern of the deflection assembly, wherein each activation pattern corresponds to a different motion figure of the beam focus. For example, a first activation pattern can correspond to a transverse linear motion (line scan) of the beam focus, which is achieved solely by the oscillating activation of a first deflection component. A second activation pattern can then correspond to a similar transverse line scan, which extends perpendicular to the line scan of the first activation pattern and is achieved solely by means of a second deflection component.

A third deflection pattern can correspond, for example, to a circular path, for the realization of which the mentioned first and second deflection components can be activated together. In this manner, not only can the individual influence of the deflection components on the dynamic behavior of the focusability of the laser beam be determined, but also the combined influence thereof.

Of course, the deflection assembly can be activated alternatively or additionally in accordance with any other scan figures, as desired. More particularly, other scan figures of this type can contain an exclusive or at least a partial z-movement of the beam focus (longitudinal focus adjustment).

The method according to the invention can further comprise the output of the measured power and/or of at least one parameter derived therefrom to at least one output device. The output device can be a monitor, an oscilloscope or a printer, for example. More particularly, the output step can comprise the output of a profile over time and/or of a frequency spectrum of the measured power on the output device. Examples of parameters derived from the measured power include, for example, an average power value, averaged over the period of measurement, and/or extreme values for the measured power (minima, maxima) and/or values for the standard deviation and/or variance of the power measured within a predetermined period of measurement. The spectral amplitudes of a determined frequency spectrum of the measured power can also be considered a derived parameter within the context of the invention.

If the dynamic influence of the deflection assembly on the focusability of the laser beam for different oscillation frequencies and/or different oscillation strokes and/or different activation patterns of the deflection assembly is to be analyzed within the framework of analysis of the laser system, it is recommended to output the measured power and/or the at least one derived parameter separately for different values for frequency and/or stroke and/or for different patterns of an oscillating adjustment of at least one deflection component of the deflection assembly.

The invention can be used to detect and remove deflection components that fail to satisfy certain qualitative requirements. For this purpose, it is advantageous for the method to comprise a step that involves comparing the measured power and/or at least one parameter derived therefrom with at least one predefined reference value.

The reference value can be predefined by the manufacturer or by the user, or it can be determined from previous measurements, which have been carried out using different deflection assemblies. For example, the reference value can be a measured value which has been determined for a deflection assembly (or a deflection component thereof) that has been qualified as acceptable. It is also possible to determine the reference value from a plurality of measured values, which have been determined within the framework of previous analyses of a plurality of different deflection assemblies.

Based upon the result from the comparison of the measured power and/or the at least one parameter derived therefrom with the at least one reference value, the quality of the analyzed deflection assembly can be assessed, and optionally a replacement of the analyzed deflection assembly or of at least a part thereof can be arranged. The comparison can be carried out by the analysis personnel. It is also possible for the laser system to be equipped with a suitable electronic evaluation unit, which performs the comparison automatically and communicates the result of the comparison to the analysis personnel via a suitable interface.

The method according to the invention is suitable particularly for series analysis, in which the power measurement of the frequency multiplied radiation is carried out multiple times in parallel or in succession over time, in each case using at least a partially different deflection assembly. This makes it possible, for example, for a manufacturer to analyze the deflection components it produces individually, before supplying them to customers.

Alternatively or additionally, the method according to the invention is suitable for online monitoring of the wavefront quality of the laser beam, in which the frequency multiplied radiation is generated from the partial beam, and the power measurement is carried out during processing of a material using the laser beam. In this case, power measurement can be carried out continuously or at least repeatedly at temporal intervals. If the results of the power measurement indicate a deterioration of wavefront quality, this can be taken as a cause for discontinuing processing of the material or at least temporarily suspending said processing. Of course, such a discontinuation or suspension of processing can be implemented automatically via a suitable control unit of the laser system.

According to a further aspect, the invention provides a device for analyzing a laser system, which provides a focused laser beam and has a controllable deflection assembly for controlling the transverse and/or longitudinal position of the beam focus. More particularly, this device can carry out the analysis of the laser system using a method of the type described above. The device comprises:
- a frequency multiplier for generating frequency multiplied radiation from the laser beam or from a partial beam branched therefrom downstream of the deflection assembly, wherein the wavelength of the frequency multiplied radiation corresponds to an uneven higher harmonic of the wavelength of the laser beam,
- a measurement assembly for measuring a power of the frequency multiplied radiation,
- a test program, the implementation of which, by way of a program-controlled control unit that controls the deflection assembly, effects an oscillating adjustment of at least one deflection component of the deflection assembly, which is such that the beam focus describes the same path of motion several times in succession.

In a preferred embodiment, the implementation of the test program by the control unit can cause the beam focus to describe the same path of motion (e.g., line, circle) with a varying oscillation frequency of the at least one deflection component. Alternatively or additionally, the implementation of the test program by the control unit can cause the beam focus to describe different paths of motion in succession. The different paths of motion can, for example, comprise two straight lines extending transversely in a transverse plane, particularly extending perpendicular to one another. It is also possible for one of the different paths of motion to be a circular path extending within a transverse plane.

BRIEF DESCRIPTION OF THE DRAWINGS

In what follows, the invention will be described in greater detail in reference to the attached set of drawings. The drawings show:

FIG. 1: a schematic illustration of an embodiment example of a laser system and a device for analyzing the dynamic radiation quality of the laser radiation generated by the laser system, FIGS. 2a, b and c: examples of scan figures for analyzing dynamic distortions of the wavefront of the laser radiation of the laser system of FIG. 1, FIG. 3: an example of a possible measurement result with different scan frequencies.

DETAILED DESCRIPTION OF THE DRAWINGS

Figure 2A:
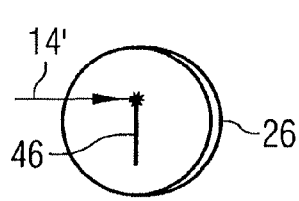

The laser system illustrated in FIG. 1 and generally identified therein by the number 10 has a laser source 12 for pulsed laser radiation, having pulse durations within the range femtosecond range (e.g., a few 100 Fs). The radiation exits the laser source 12 in the form of a laser beam 14, which is expanded by means of beam expanding optics 16 embodied as a Galilei telescope, and is then scanned and focused by means of a scanning and focusing unit 18. The scanning and focusing unit 18 contains components, not illustrated in detail, for controlling the transverse and preferably also longitudinal position of the beam focus. For example, these components comprise a pair of galvanometrically controlled deflection mirrors, which can be pivoted about two tilt directions, extending perpendicular to one another, and which enable a transverse scanning of the laser beam 14. For the longitudinal scanning of the laser beam 14, the scanning and focusing unit 18 can comprise a lens or group of lenses that is displaceable in the direction of the beam path, for example. Alternatively, a longitudinal focus control is possible, for example, in which, with an unmodified focusing adjustment, a lens of the beam expanding optics 16 is adjusted, for example, by way of linear movement in the beam direction or by way of refractive power variation in the case of a refractive power variable lens.

For the purpose of illustration, in what follows it is assumed that all optical components required for transverse and longitudinal focus control are combined in the scanning and focusing unit 18. Of course, it is understood that these components (deflection components) can be arranged distributed at least partially inside the laser system 10. More particularly, the functions of transverse deflection and longitudinal deflection can be allocated to different units according to the components.

For focusing, the scanning and focusing unit 18 can contain an F-theta objective, for example. The focused laser beam output by the scanning and focusing unit 18 is identified as 14'.

A program controlled process control computer 20 controls the laser source 12 and the scanning and focusing unit 18 in accordance with a control program stored in a memory 22. For processing a material, for example, human eye tissue, the control program represents an incision figure to be produced. This incision figure can be a flap incision, for example, such as is necessary for producing a flap during LASIK treatment of the human eye. Examples of other incision figures include a so-called lenticel incision, such as is necessary for corneal lenticel extraction, and a corneal endothelial incision, such as is necessary for an endothelial keratoplasty of the human cornea.

Rapid mechanical adjustments of the optical components located in the beam path of the laser beam 14 can lead to temporary deformations of said components, and, associated therewith, to undesirable wavefront distortions of the laser radiation. The dynamic of these wavefront distortions is a critical piece of information for the user of the laser system 10. Ultimately, such wavefront distortions diminish the focusability of the laser beam 14, which can have a disadvantageous effect on cutting precision. Adjustment processes that can be executed at a speed that will allow the above-mentioned dynamic impairments of wavefront quality to occur are possible particularly during scanning of the laser beam 14. For example, the scanner mirrors used for transverse focusing control can experience temporary deformations at the mirror edges due to the inertia of said mirrors, when the mirrors are moved at sufficient speed.

In order to analyze the dynamic quality of the laser system 10 and particularly of the optical components used for localized focusing control, a test device, generally identified by the number 24, is provided, which produces a frequency multiplied beam 14" of third or higher uneven order from the focused laser beam 14' or from a partial beam, branched therefrom by a divider mirror, for example, and measures the power thereof. For this purpose, the test device 24 comprises an optically nonlinear medium 26 to be arranged in the focus of the focused laser beam 14', which medium produces radiation having the correspondingly multiplied frequency of the laser beam 14 in a nonlinear process. The nonlinear medium 26 is isotropic, so as to enable a conversion efficiency that is independent of the propagation direction of the focused laser beam 14'. Because the laser system 10 is analyzed while the scan function is activated, i.e., while the laser beam 14 is being scanned by means of the scanning and focusing unit 18, the direction at which the focused laser beam 14' strikes the nonlinear medium 26 changes, at least during transverse scanning. The isotropy of the nonlinear medium 26 makes it possible to eliminate the influence of such changes in the direction of the focused laser beam 14' on conversion efficiency.

By means of a convergent lens 28 disposed downstream of the nonlinear medium 26, the radiation emitted from the medium 26 is directed toward a wavelength separator 30, in this case embodied as a prism. The separator 30 separates the remaining fundamental wave radiation (i.e., the radiation at the wavelength of the laser beam 14) from the generated frequency tripled radiation. The fundamental wave radiation—represented by a beam 14'"—is absorbed into a beam trap 32, whereas the frequency tripled radiation represented by the beam 14" travels through an optical filter 34 to a power meter 36. The power meter 36 transmits a measurement signal, which represents the measured power of the frequency tripled beam 14", to the process control computer 20. Said computer displays values (e.g., the path over time) on an output device 38, illustrated here by way of example as a monitor, for the measured power of the frequency tripled beam 14" and/or values of at least one parameter derived from the measured power. The power meter 36 can be embodied, for example, as a photodiode combined with an Ulbricht sphere. Ulbricht spheres are known in the art; they enable a power measurement that is independent of the direction of incidence of the laser radiation to be measured.

The filter 34 filters any disruptive secondary lines and residues of the fundamental wavelength out of the frequency tripled radiation. A further convergent lens 40 disposed downstream of the wavelength separator 30 gathers the various radiation fractions and supplies them to the beam trap 32 (for the fundamental wave radiation) or to the power meter 36 (for the frequency tripled radiation).

The components 26, 28, 30, 32, 34, 36, 40 can be combined to form a single unit in a shared housing (not illustrated), making handling of the test device 24 and analysis of the laser system 10 particularly simple.

To carry out an analysis of the laser system 10 using the test device 24, the scanning and focusing unit 18 is controlled by the process control computer 20 such that the laser beam 14' focused on the nonlinear medium 26 describes at least one predefined scan figure. Expediently, control is carried out in such a way that the laser beam 14' describes a plurality of different scan figures in succession. For this purpose, a test program is stored or can be stored in the memory 22, and contains suitable control instructions for effecting this/these scan figure(s).

Figure 2B:
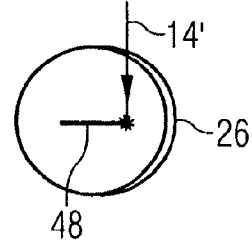
Figure 2C:
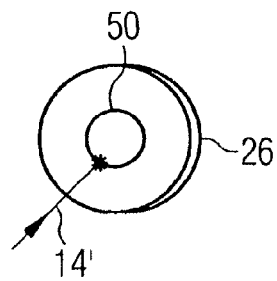

With regard to possible scan figures, reference will now additionally be made to FIGS. 2a to 2c. In these figures, the nonlinear medium 26 is illustrated schematically as a disk-shaped element. Of course, this is in no way intended as a restriction; instead, any structural embodiments for the nonlinear medium 26 are possible.

FIGS. 2a to 2c also illustrate scanner mirrors 42, 44 with their respective drive axes, with said mirrors forming a mirror pair used for transverse focus control, which can be used in the scanning and focusing unit 18 of the laser system 10.

According to FIG. 2a, a first scan figure consists of a straight scan line 46, which can be achieved by an oscillating back-and-forth tilting of one of the two scanner mirrors, in this case the mirror 42. The other scanner mirror 44 remains stationary for this scan figure; in this manner, the dynamic influence of the scanner mirror 42 on the focusability of the laser beam 14 can be analyzed.

According to FIG. 2b, a second scan figure is similarly formed by a straight line 48, however said line lies perpendicular to the scan line 46 of FIG. 2a and is produced solely by a back and forth tilting of the scanner mirror 44. In this case, the scanner mirror 42 remains stationary. This enables an analysis of the dynamic influence of the scanner mirror 44 on the radiation quality of the focused laser beam 14'.

According to FIG. 2c, by tilting both scanner mirrors 42, 44 back and forth simultaneously, a circular path 50 can be produced as the scan figure. Since in practical applications frequently both scanner mirrors 42, 44 are moved simultaneously, such analysis is expedient for analyzing the dynamic influence of both scanner mirrors 42, 44 together on radiation quality.

The test program for the process control computer 20 can be used not only to implement various scan figures (such as are illustrated, for example, in FIGS. 2a to 2c). It can alternatively or additionally be embodied for implementing at least one scan figure with varying oscillation frequency and/or varying oscillation stroke of the relevant deflection component(s). A varying oscillation stroke can effect a shortening or lengthening of the scan line 46, for example, in the case of FIG. 2a. In the case of FIG. 2c, such a variation can effect a decrease or increase in the diameter of the circular path 50 (as long as the oscillation strokes of both scanner mirrors 42, 44 are adjusted similarly), or a distortion of the circular path 50 to an elliptical path (with a non-uniform variation of the oscillation stroke of the scanner mirrors 42, 44).

In contrast, a variation of the oscillation frequency causes the relevant scan figure to be traversed more rapidly or more slowly.

The measured values obtained by means of the power meter 36 can be stored in the memory 22, optionally together with any derived values, which are calculated therefrom by the process control computer 20. The output to the output device 38 can then be carried out at a later time, once a series of measurements have been carried out. However, it is also conceivable for the measured power values to be output to the output device 38 in real time, so to speak, for example, in the form of an oscillogram. Such an oscillogram depicts the path over time of the measured power during one or more oscillation periods. On the basis of the fluctuations in power during an oscillation period, a conclusion may be reached regarding the extent of the wavefront distortions, which are caused by the mass-based inertia of the relevant deflection component(s).

Alternatively or in addition to an oscillogram of this type, an output display as illustrated by way of example in FIG. 3 is also possible. The numerical values shown there are based upon measurements that have been determined from a circular scan similar to FIG. 2, with variation of the oscillation frequency of the used scanner mirrors of between 50 and 900 Hz and a power of the laser beam of 132.5 mW. The power $P_{THG}$ of the frequency tripled radiation in μW is plotted on the ordinate of the diagram of FIG. 3. Each of the plotted symbols represents the average power during a one-minute circular scan at the relevant frequency (square filled in in black) and the standard deviation of the measured power at the relevant frequency (vertical line with horizontal cross-lines). It is clear that the average power of the frequency tripled radiation decreases as the scanning frequency increases. At the same time, the standard deviation of the measured power increases as the scanning frequency increases. This is clear from the fact that the deformations at the reversal points of the mirror oscillation are more intense, the higher the scanning frequency is. Therefore, conclusions regarding the quality of the scanner mirrors that are used can likewise be drawn from the frequency dependency of the power. If, with a measured scanner mirror or a measured mirror pair, the decrease in power at higher frequencies is more intense than with a reference mirror or pair of reference mirrors that has been evaluated to be in proper condition, this can be taken by the user as a cause for replacing the mirror or the pair of mirrors and for removing them as unsuitable. The same applies similarly to analyses of the path over time of the power during an oscillation period. In this case, an analysis of the path over time and a comparison with suitable reference data can permit a conclusion regarding the mechanical quality of the analyzed deflection components.

It has already been mentioned that the frequency multiplied beam 14" can be generated from a partial beam, which is branched off from the laser beam 14'. In other words, it is not necessary to use the entire laser beam 14' for analyzing the radiation quality of the laser system 10; rather, it is sufficient to couple a fraction (e.g., approximately 5 to 10%) out of the laser beam 14', for example, by means of a divider mirror, not illustrated in the drawings. In order to allow the partial beam to be used for analyzing the effect of the high speed movements of the deflection components on wavefront quality, said beam is branched off in the beam direction downstream of those components of the scanning and focusing unit 18 that effect the scanning function, but expediently upstream of the focusing components of the unit 18. For focusing the branched partial beam onto the nonlinear medium 26, a special focusing lens can be provided, which also is not illustrated in detail in the drawings. With an embodiment of this type, online analyses of the laser system 24 are possible, i.e., the partial beam can be used to analyze radiation quality directly during processing of a material by way of the laser beam 14' (main beam).

The invention claimed is:

1. A method for analyzing a laser system, which system provides a focused laser beam and has a controllable deflection assembly for controlling the transverse and/or longitudinal position of the beam focus, wherein the method comprises:

directing the laser beam or a partial beam branched off from said beam downstream of the deflection assembly onto an optically nonlinear medium for the purpose of generating frequency multiplied radiation, the wavelength of which corresponds to an uneven higher harmonic of the wavelength of the laser beam, activating the deflection assembly, measuring a power of the frequency multiplied radiation with the deflection assembly activated.

2. The method according to claim 1, wherein the laser beam or the partial beam is focused onto the nonlinear medium.

3. The method according to claim 1, wherein the activation of the deflection assembly comprises an oscillating adjustment of at least one deflection component of the deflection assembly.

4. The method according to claim 3, wherein the activation of the deflection assembly comprises a change in the oscillation frequency and/or the oscillation stroke of at least one deflection component.

5. The method according to claim 1, wherein the activation of the deflection assembly comprises a change in an activation pattern of the deflection assembly, wherein each activation pattern corresponds to a different motion figure of the beam focus.

6. The method according to claim 1, further comprising outputting the measured power and/or of at least one parameter derived therefrom to at least one output device.

7. The method according to claim 1, comprising outputting a profile over time and/or of a frequency spectrum of the measured power to the output device.

8. The method according to claim 1, comprising outputting the measured power and/or of the at least one derived parameter separately for different values for frequency and/or stroke and/or for different patterns of an oscillating adjustment of at least one deflection component of the deflection assembly.

9. The method according to claim 1, further comprising comparing the measured power and/or of at least one parameter derived therefrom with at least one predefined reference value.

10. The method according to claim 1, comprising carrying out the power measurement of the frequency multiplied radiation multiple times, wherein between each of the measurements, at least one deflection component of the deflection assembly is replaced.

11. The method according to claim 1, wherein the frequency multiplied radiation is generated from the partial beam, and the power measurement is carried out during processing of a material with the laser beam.

12. A device for analyzing a laser system, which system provides a focused laser beam and has a controllable deflection assembly for controlling the transverse and/or longitudinal position of the beam focus, wherein the device comprises:

a frequency multiplier for generating frequency multiplied radiation from the laser beam or from a partial beam branched therefrom downstream of the deflection assembly, wherein the wavelength of the frequency multiplied radiation corresponds to an uneven higher harmonic of the wavelength of the laser beam, a measurement assembly for measuring a power of the frequency multiplied radiation, a test program, the implementation of which, by way of a program-controlled control unit that controls the deflection assembly, effects an oscillating adjustment of at least one deflection component of the deflection assembly, which is such that the beam focus describes the same path of motion several times in succession.

13. The device according to claim 12, wherein when the test program is executed by the control unit, said execution causes the beam focus to describe the same path of motion with varying oscillation frequency of the at least one deflection component.

14. The device according to claim 12, wherein when the test program is executed by the control unit, said execution causes the beam focus to describe different paths of motion in succession.

15. The device according to claim 14, wherein the different paths of motion comprise two straight lines extending transversely in a transverse plane, more particularly, extending perpendicular to one another, and/or wherein one of the different paths of motion is a circular path extending in a transverse plane.

* * * * *